G. E. TORNSJO.
WEIGHING SCALE.
APPLICATION FILED MAY 7, 1915.

1,163,047.

Patented Dec. 7, 1915.
4 SHEETS—SHEET 1.

WITNESSES:

INVENTOR:
G. E. Tornsjo.
BY his ATTORNEY:
A. M. Carlsen.

G. E. TORNSJO.
WEIGHING SCALE.
APPLICATION FILED MAY 7, 1915.

1,163,047.

Patented Dec. 7, 1915.
4 SHEETS—SHEET 2.

WITNESSES:
A. E. Carlsen.
L. C. Carlsen.

INVENTOR:
G. E. Tornsjo
BY his ATTORNEY:
A. M. Carlsen.

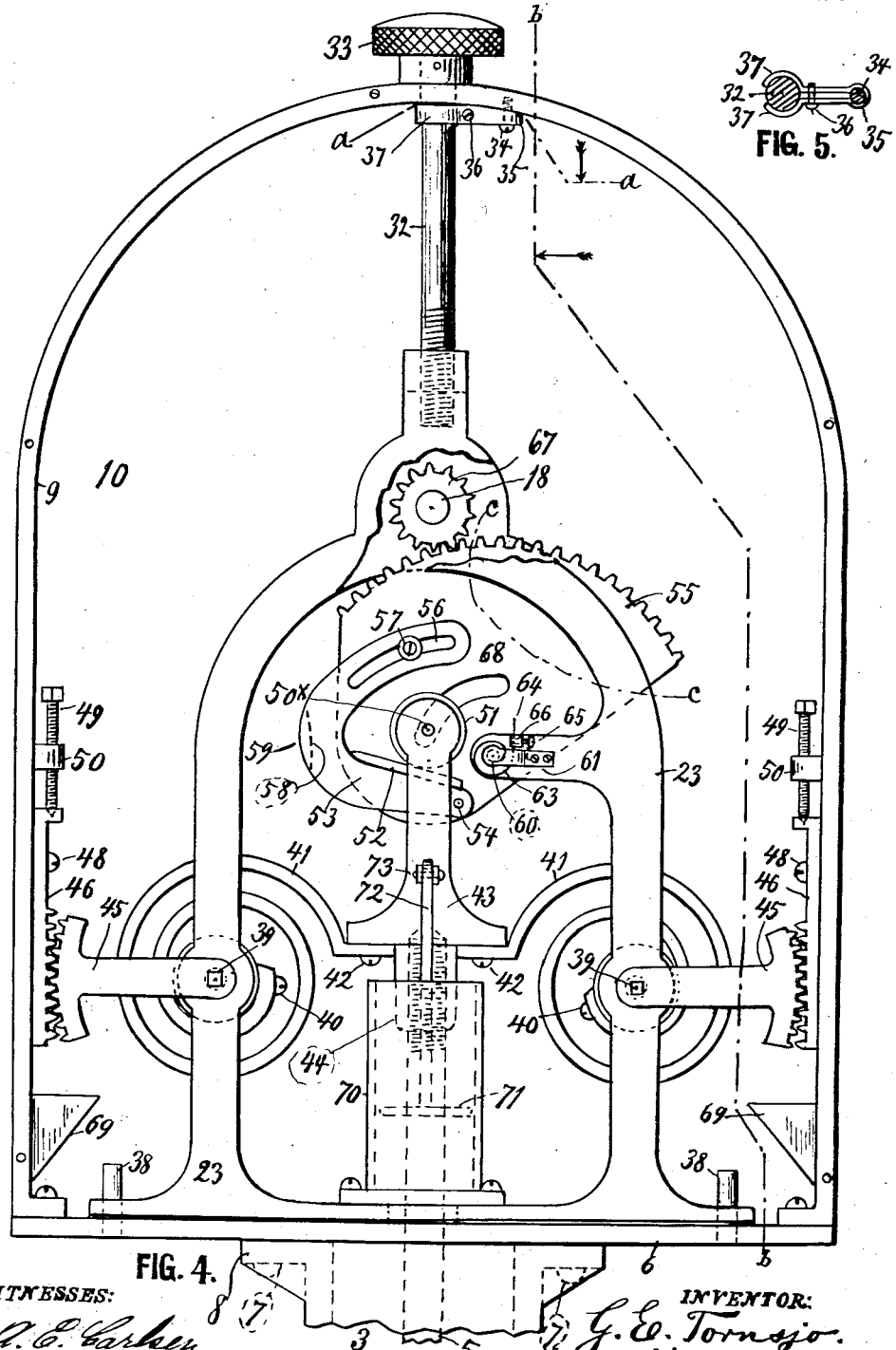

G. E. TORNSJO.
WEIGHING SCALE.
APPLICATION FILED MAY 7, 1915.

1,163,047.

Patented Dec. 7, 1915.
4 SHEETS—SHEET 4.

WITNESSES:
G. E. Carlsen
L. C. Carlsen

INVENTOR:
G. E. Tornsjo.
BY his ATTORNEY:
A. M. Carlsen.

UNITED STATES PATENT OFFICE.

GUSTAF E. TORNSJO, OF ST. PAUL, MINNESOTA.

WEIGHING-SCALE.

1,163,047.  Specification of Letters Patent.  Patented Dec. 7, 1915.

Application filed May 7, 1915. Serial No. 26,453

*To all whom it may concern:*

Be it known that I, GUSTAF E. TORNSJO, a citizen of the United States, residing at St. Paul, in the county of Ramsey and State of Minnesota, have invented a new and useful Weighing-Scale, of which the following is a specification.

My invention relates to weighing scales, and the object is to provide a weighing scale so improved that its mechanism will be efficient, durable, accurate and easy of adjustment.

In the accompanying drawings;—

Figure 1:
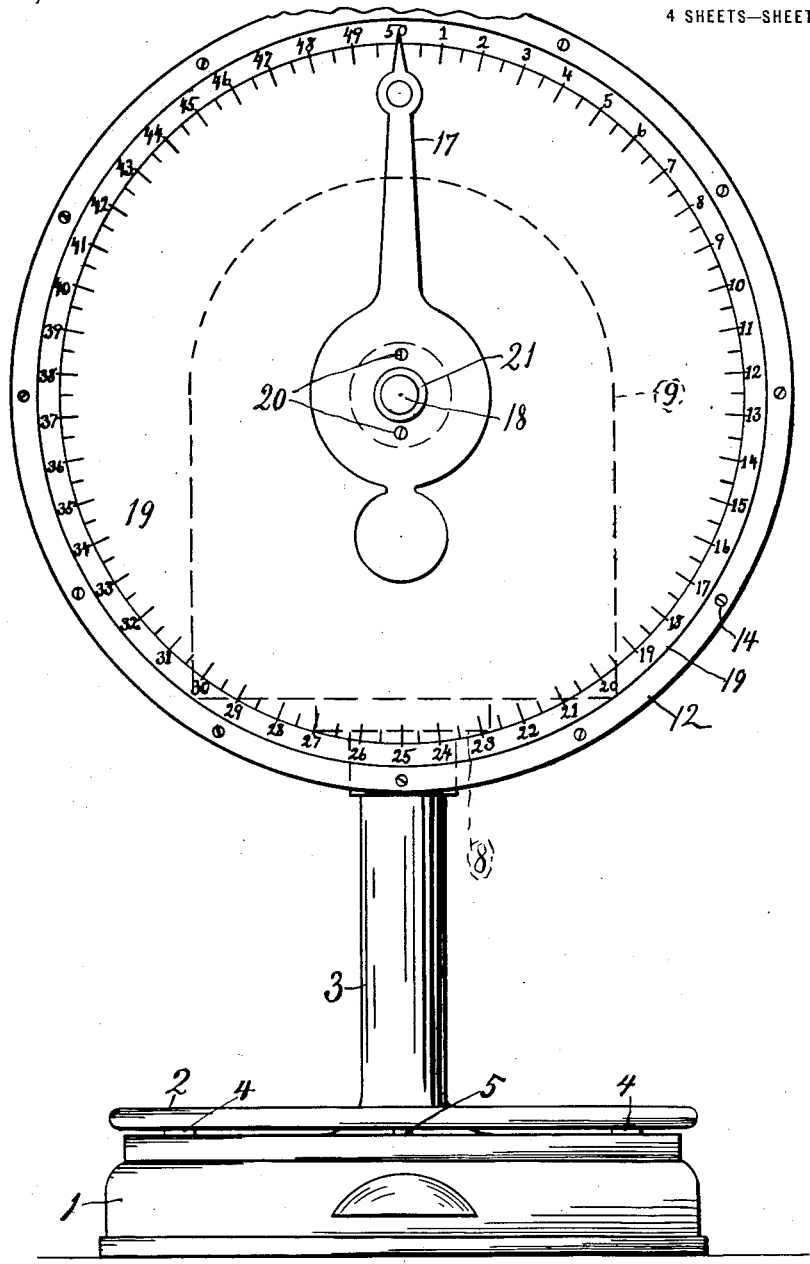
Figures 2, 3:
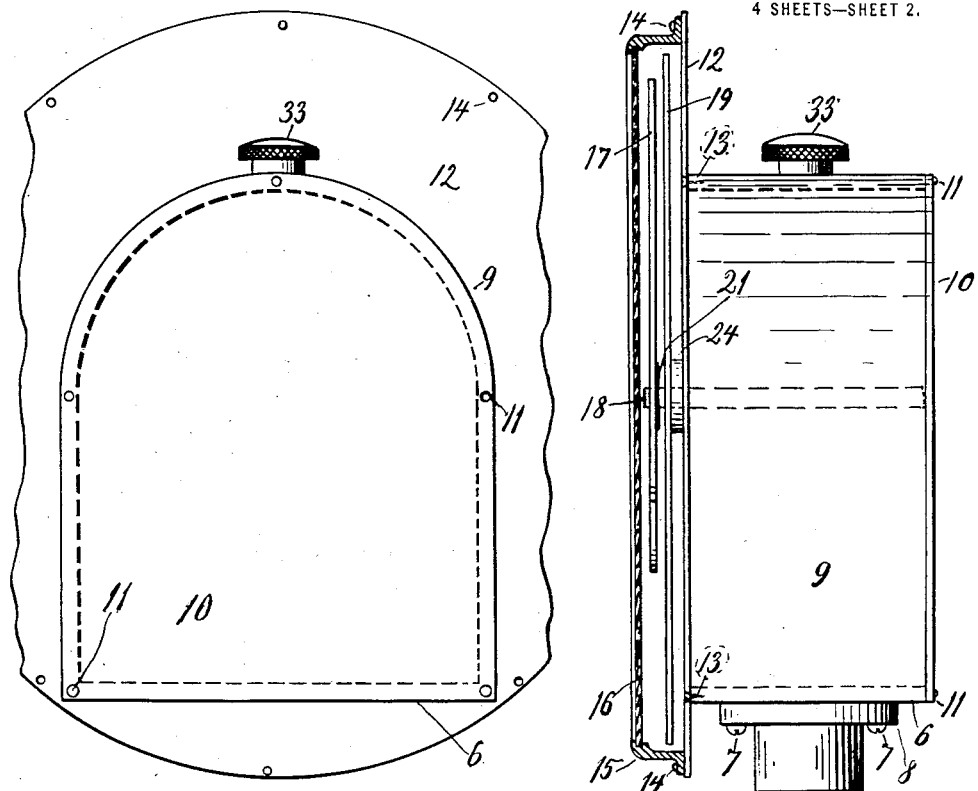
Figure 7:
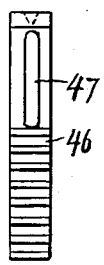
Figure 8:
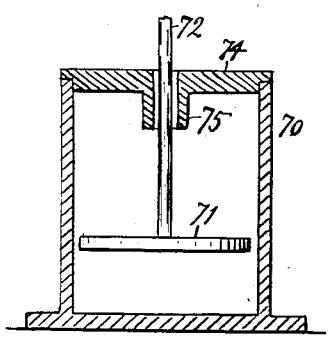
Figure 9:
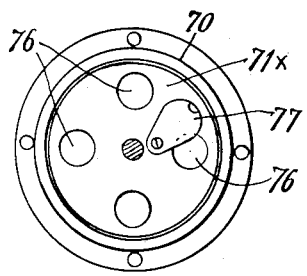
Figure 6:
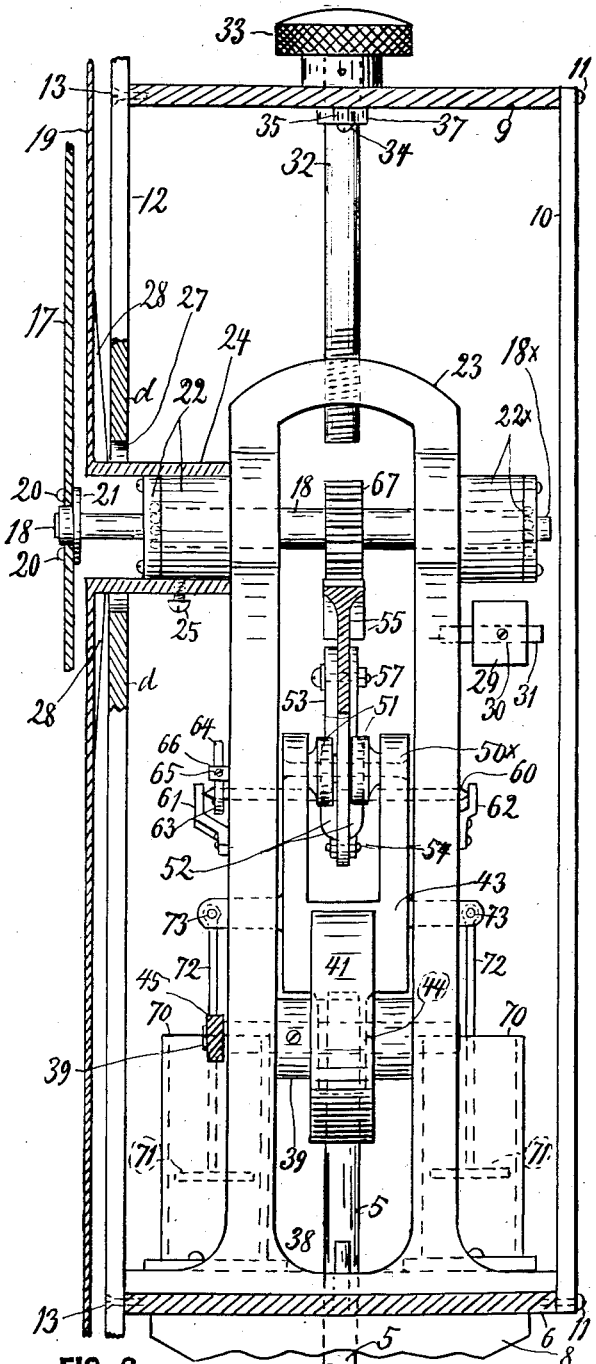

Figure 1 is a front elevation of my improved weighing scale. Fig. 2 is a side elevation of the scale shown in Fig. 1, with the glass and sash over the dial in central vertical section. Fig. 3 is a rear elevation of the head or upper portion of the scale in Fig. 2. Fig. 4 is an enlarged front elevation of the scale head with its dial and front plate removed and a portion of the mechanism frame broken away to expose a gear pinion near above the middle of the view. Fig. 5 is a section on the line $a$—$a$ Fig. 4. Fig. 6 is a side elevation of the scale head with the dial and dial finger in central vertical section, a portion of the front member 12 of the casing broken away at $d$—$d$ Fig. 6, and arched casing member 9 broken away at the line $b$—$b$ Fig. 4, and the toothed sector 55 in Fig. 4 broken away above the line $c$—$c$. Fig. 7 is a detail face view of one of the racks 46 Fig. 4. Fig. 8 is an enlarged diametrical sectional view of one of the two dash-pots 70 shown in Figs. 4 and 6. Fig. 9 is a top view of one of the dash-pots open and with a modified piston in it.

Referring to the drawings by reference numerals, 1 designates the base, 2 the platform, 3 the usual tubular post, 4 the mechanism supporting the platform, and 5 the usual rod extending upward through the post and connecting the platform mechanism with the weighing and weight indicating mechanisms, which together with its casing is usually termed the head of the scale. In the drawings said head commences with a base plate 6, which is secured by screws 7 to the top flange 8 of the post 3. The part of the scale below the head plate 6 may be of any suitable construction as my present invention resides in improvements located in the head of the scale, which will now be described.

The casing of the head is preferably composed of the base plate 6, an arched frame plate 9, a rear plate 10 secured thereto by screws 11, and a front plate 12 secured by screws 13. Said front plate is larger than the arch and is of circular form. Secured upon said front plate by screws 14 is a circular sash 15, in which is suitably secured a glass 16 (see Fig. 2) through which the operator can observe the position of a dial-finger 17, mounted on a shaft 18 and pointing to the circular row of weight-indicating numbers upon a dial 19. In Fig. 1 said dial is shown to contain the numbers 1 to 50, which may indicate that many pounds and half pounds or other fractions of pounds as the capacity of the scale, which capacity represents any number of pounds or other units of weight and fractions thereof according to the size of the scale and the weight units customary where the scale is to be used.

The dial finger or pointer 17, is secured by screws 20 (see Fig. 6) to a collar 21, and the latter is secured on a shaft 18, which is journaled in ball-bearings 22 and $22^\times$ of the mechanism frame 23 and may have a similar pointer (not shown) arranged upon its rear end $18^\times$ so as to indicate the weight also upon the rear side of the head, on a dial with reversely arranged weight-indicating numbers (not shown). The dial 19 has a sleeve 24 secured by a screw 25 upon the front ball-bearing tube 22, and the front plate 12 is provided with an aperture 27 large enough for the sleeve 24 to move up and down therein sufficiently to permit adjustment of the weighing springs, as will presently be fully described.

28 in Fig. 6 are radial ribs holding the dial more firmly on its sleeve 24.

29 is a weight adjustably held by a screw 30 upon an arm 31 at the rear of the frame 23 so as to counterbalance the dial and dial finger at the front of said frame.

The frame 23 is suspended from the top of the arch 9 by a long screw 32, having a thumb head 33 and a braking device to prevent its accidental rotation, said brake is clearly shown in Figs. 4 and 5 to be held by a screw 34 in a loop 35 and to have an adjusting screw 36 arranged to draw brake shoes 37 tightly about the screw 32. The lower end of the frame 23 is slidable on guiding pins 38 and will usually hang free from the bottom plate 6, as shown in Fig. 4.

Journaled in the frame 23 are two shafts 39, upon each of which is secured at 40 one end of a suitably stiff spiral spring 41, whose outer end is secured by a screw 42 to a casting 43, having a central downward extension 44, into which is screwed the upper end of the "stilliard" or rod 5 from the platform mechanism. To adjust these springs to the tare of the scale each shaft 39 has a toothed sector 45 engaged by a vertically slidable rack 46 having a slot 47 (shown in Fig. 7) so it can slide on a screw 48. The springs will at all times tend to move said racks upward, but each rack is resisted and adjusted downward by a screw 49 threaded in a lug 50 fixed on the arch 9, so that by turning said screws 49 the springs may be so adjusted that the dial finger will be at the starting point of the dial when the platform is poised for weighing. Should wear and tear or rust or dust or dirt or atmospheric changes afterward cause slight variations in the idle position of the pointer, it will not be necessary to get into the scale head and turn the screws 49, as such slight adjustment can be made by taking hold of the external screw head 33 and turning the screw 32, since said screw will slightly raise or lower the frame 23 and thereby cause the toothed sector or levers 45 to vary the tension of the springs. It is for this kind of adjustment that the clearing 27 shown in Fig. 6 is required.

Mounted on a pivot 50ˣ in the upper forked portion of the casting 43 are two anti-friction rollers 51. Said rollers rest upon broad flanges or faces 52 of a horseshoe-shaped cam 53, which is pivoted at 54 to a toothed sector 55 and provided in the other end with a slot 56 through which and through the sector is passed a bolt 57, by which the cam is firmly secured to the sector in suitable tilted position on the pivot 54. Said cam 53 is preferably made in two halves, one of which is fitted to each side of the sector 55, the halves are however firmly secured together by an intervening solid portion 58—59 in Fig. 4.

The toothed sector 55 is fixed on a shaft 60, which is journaled in the frame 23 and provided with sensitive end point bearing against bracket 61, 62. To said shaft is fixed one end of a spiral spring 63, having its outer end 64 adjustably held by a screw 65 in a lug 66 on the frame, said spring and adjusting means are to counter balance the sector 55 and to hold the flanges 52 at all times in contact with the rollers 51. The sector 55 is constantly in mesh with a gear pinion or wheel 67, which is fixed on the shaft 18 carrying the dial finger. In Fig. 4, 68 is a curved slot in the sector 55, serving as a clearing for the shaft 50ˣ.

In the operation of the scale when goods are placed on the platform 2 to be weighed, the downward movement of the rollers 51 upon the flanges 52 causes the sector 55 to turn and move the dial finger, the springs 41 yielding with a downward movement and a slight winding movement caused by the downward movement of the ends of the springs secured to the member 43. If in the regulating of the scale the dial finger moves too fast or too slowly for indicating the actual weight on the platform this is remedied by loosening the bolt 57 and adjusting the cam with the face 52 into a more or less inclined position than it originally had. This adjusting and the adjustments obtainable by the screws 49 and 33 and 65 enables the scale to be fully adjusted when the springs 41 are made of approximately right size and stiffness.

In Fig. 4, 69 are vessels to hold kerosene for drawing dirt which might otherwise get into the mechanisms and interfere with their correct working. In Figs. 4 and 6 are shown dash-pots 70, having pistons 71 with rods 72, connected at 73 with the member 43; said dash-pots being partly filled with oil the pistons prevent sudden jerks of the mechanism and the dial finger operated thereby.

In Fig. 8 is shown that the cover 74 of each dash-pot has a tubular downward extension 75 to prevent the oil from splashing out of the cylinder when escaping upward between it and the piston.

In Fig. 9 is shown how the piston 71ˣ may practically fill the cylinder in diametrical direction and be provided with apertures 76 for the oil to move through one of said apertures having a swinging lid 77, by which the aperture may be more or less closed and the speed of the movement of the piston regulated thereby.

What I claim is:—

1. In a weighing scale, the combination with a base having a hollow post, a lever mechanism in the base, a rod extending from the lever mechanism up through the post, a casing fixed on the top of the post, a mechanism frame suspended and guided to move vertically in the casing, a forked member fixed at the top of the rod in the post, winding shafts journaled in the mechanism frame and provided with radial winding arms having operative connection with the casing, spiral springs having their outer ends connected with the winding shafts so as to be wound thereon and their inner ends connected with the forked member to support it and thereby the rod and platform, a toothed sector mounted in the frame and operatively connected with the forked member, a gear wheel rotated by the sector, a weight-indicating dial carried by the mechanism frame, and a dial finger operatively connected with the gear wheel.

2. In a weighing scale, the combination with a base having a hollow post, a lever mechanism in the base, a rod extending from the lever mechanism up through the post, a casing fixed on top of the post, a mechanism frame suspended and guided to move vertically in the casing, a forked member fixed at the top of the rod in the post, winding shafts journaled in the mechanism frame and provided with radial winding arms having operative connection with the casing, spiral springs having their outer ends connected with the winding shafts so as to be wound thereon and their inner ends connected with the forked member to support it and thereby the rod and platform, a toothed sector mounted in the frame and operatively connected with the forked member, a gear wheel rotated by the sector, a weight indicating dial carried by the mechanism frame, and a dial finger operatively connected with the gear wheel, and means inside the casing for adjusting the tension of the springs.

3. In a weighing scale, the combination with a base having a hollow post, a lever mechanism in the base, a rod extending from the lever mechanism up through the post, a casing fixed on top of the post, a mechanism frame suspended and guided to move vertically in the casing, a forked member fixed at the top of the rod in the post, winding shafts journaled in the mechanism frame and provided with radial winding arms having operative connection with the casing, spiral springs having their outer ends connected with the winding shafts so as to be wound thereon and their inner ends connected with the forked member to support it and thereby the rod and platform, a toothed sector mounted in the frame and operatively connected with the forked member, a gear wheel rotated by the sector, a weight indicating dial carried by the mechanism frame, and a dial finger operatively connected with the gear wheel, and means inside the casing for adjusting the tension of the springs, and means outside the casing for adjusting the mechanism frame up and down for the purpose set forth.

4. In a scale-head the combination with a casing, a mechanism frame suspended in the casing, a shaft mounted in the mechanism frame, and means carried by the shaft for indicating the amount weighed, a gear pinion fixed on said shaft, a toothed sector journaled in the frame and meshing with the pinion, an adjustable incline on the sector, a vertically movable member, anti-friction rollers arranged on same to contact with the incline, a comparatively light spring acting on the sector to hold its incline constantly in touch with the rollers, springs mounted in the frame and arranged to support the vertically movable member, and a weighing rod suspended from said movable member.

5. In a weighing scale the combination with a casing, of a mechanism frame having a slight vertical movement in the casing, means for guiding such movement, a screw threaded into the top of the frame and having a head close above the top of the casing for suspending and adjusting the frame, and an adjustable brake embracing the screw to prevent accidental turning of it.

6. In a scale, the combination with a weighing rod, of winding shafts, spiral springs wound on the shafts and arranged at opposite sides of the rod and operatively connected with their outer ends to the rod to support it.

7. In a scale, the combination with a weighing rod, of flat spiral springs arranged at opposite sides of the rod and operatively connected with the rod to support it, and a winding mechanism regulating the tension of each of the springs.

In testimony whereof I affix my signature, in presence of two witnesses.

GUSTAF E. TORNSJO.

Witnesses:
HERMAN LUNDBERG,
EDWIN NYBERG.